May 9, 1967 P. R. BARNARD 3,318,228
FEED MIXING AND PROCESSING MECHANISM
Filed March 18, 1964 2 Sheets-Sheet 1

INVENTOR
PAUL R. BARNARD
BY
Duck & Zarley
ATTORNEYS

United States Patent Office 3,318,228
Patented May 9, 1967

3,318,228
FEED MIXING AND PROCESSING MECHANISM
Paul R. Barnard, Eldora, Iowa 50627
Filed Mar. 18, 1964, Ser. No. 352,799
14 Claims. (Cl. 99—235)

This invention relates to a feed mixing and processing mechanism and more particularly to a feed mixing and processing mechanism which is automatic in operation and has precise feed flow controlling means associated therewith. The grinding of grain for livestock feed has been practiced by livestock feeders for years. In recent years much emphasis has been placed on the addition of various feed supplements to the grain. A problem encountered in the addition of these supplements is the regulation or control of the quantity to be added to the grain. A further problem is encountered in that supplements do not flow satisfactorily and have a tendency to "clog" up any type of metering means. A further problem is that the attendance of an operator is required during all phases of the mixing and grinding operation. A further problem often encountered is the occurrence of "tramp metal" in the grain and supplements which can cause serious damage to the machinery involved as well as injury to the livestock.

Therefore, a principal object of this invention is to provide a feed mixing and processing mechanism which facilitates precise control and regulation thereof.

A further object of this invention is to provide a feed mixing and processing mechanism which insures a continuous flow of supplements into the grain.

A further object of this invention is to provide a feed mixing and processing mechanism which permits the metering of one or more grains or supplements to a grinding device.

A further object of this invention is to provide a feed mixing and processing mechanism which permits an automatic feed mixing and grinding operation.

A further object of this invention is to provide a feed mixing and processing mechanism which permits a measurement of the quantity of supplements and grain making up the livestock feed without interrupting the operation.

A further object of this invention is to provide a feed mixing and processing mechanism which employs necessary safety features to prevent unnecessary waste of materials and damage to equipment.

A further object of this invention is to provide a feed mixing and processing mechanism which extracts "tramp metal" from the supplements and grain making up the livestock feed.

A still further object of this invention is to provide a feed mixing processing mechanism device which is economical of manufacture, durable in use and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings, in which:

Figures 1, 2, 3:
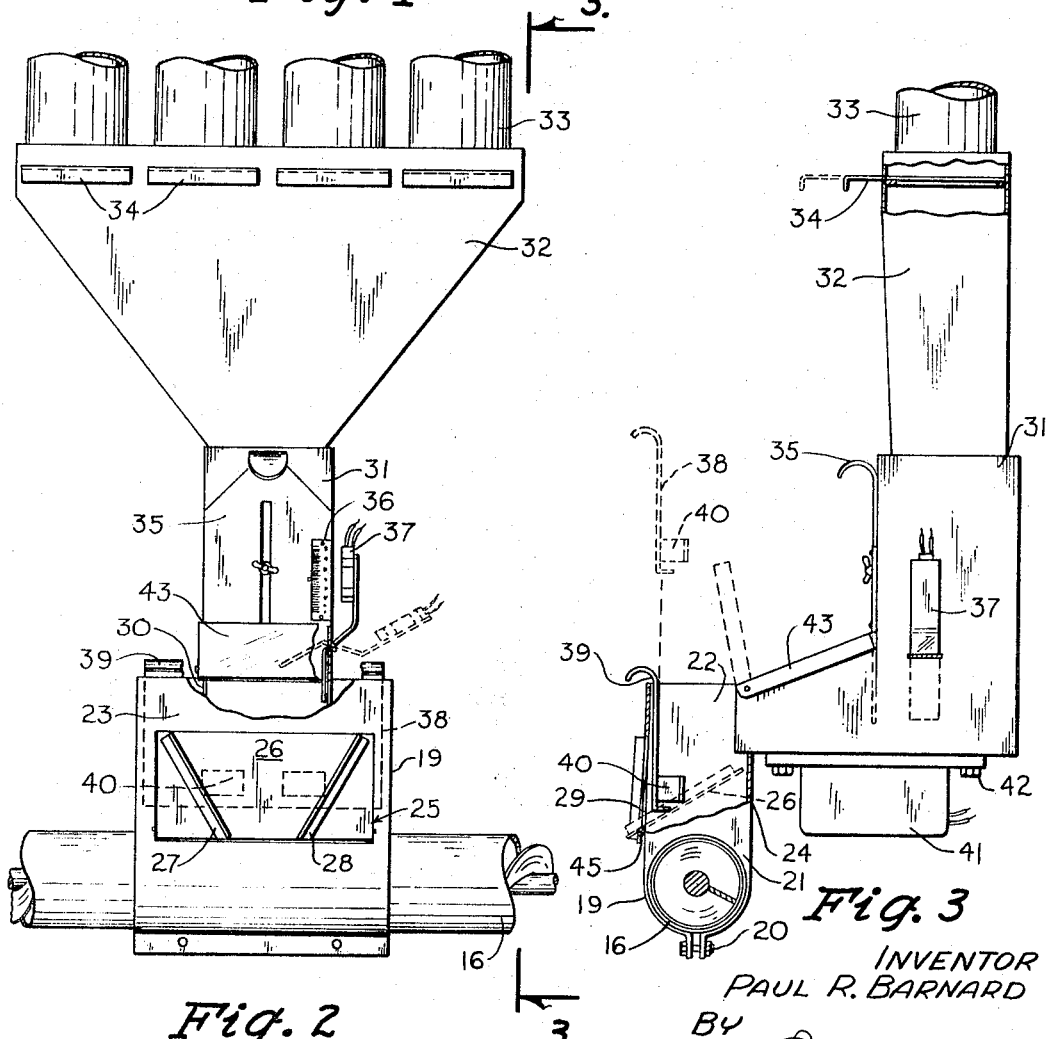
FIG. 1 is a front elevational view of the device.
FIG. 2 is a fragmentary front elevational view having a portion thereof cutaway to more fully illustrate the device.
FIG. 3 is a sectional view of the device as seen on line 3—3 of FIG. 2 having a portion cutaway to more fully illustrate the device.
Figures 4, 5:
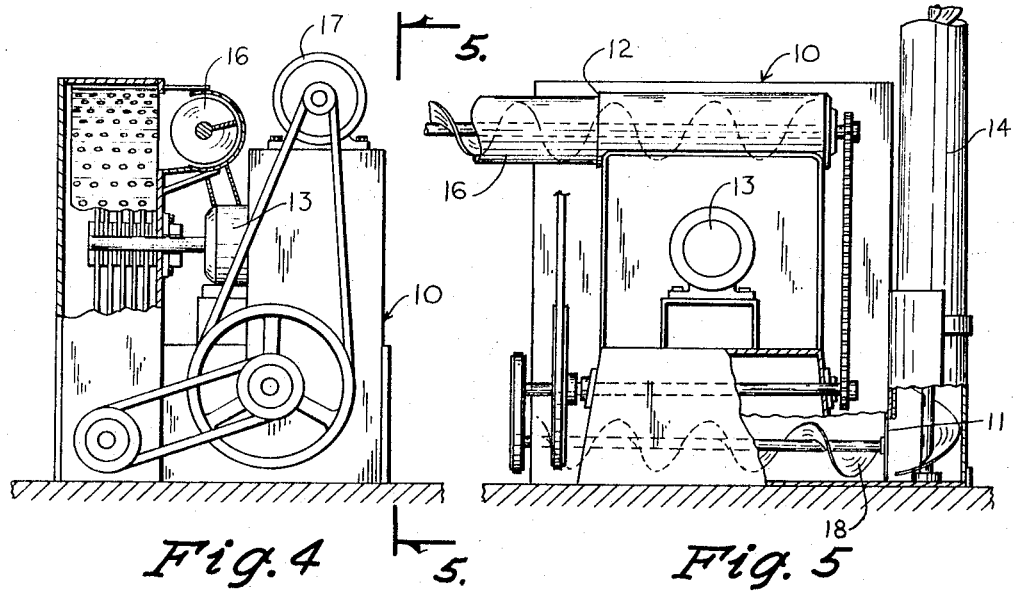
FIG. 4 is a side elevational view of the grinding mill portion of the device having a portion cutaway to more fully illustrate the device.
FIG. 5 is an elevational view of the device as seen on line 5—5 of FIG. 4 with portions cutaway to more fully illustrate the device.

The numeral 10 generally indicates a grinding mill of the ordinary type having a discharge opening 11, an intake opening 12, and a 230 volt electrical motor 13 operatively connected thereto. A discharge auger 14 is operatively connected to grinding mill 10 at discharge opening 11 and is driven by a 110 volt electrical motor 15. An intake auger 16 is operatively connected to grinding mill 10 at intake opening 12 and is driven by a 110 volt electrical motor 17 which is secured to grinding mill 10. Motor 17 also operates auger 18 in grinding mill 10 as illustrated in FIGS. 4 and 5. Intake auger 16 has secured thereto at least one housing 19 which embraces auger 16 as shown in FIG. 3 and is held in place by bolts 20. FIG. 1 illustrates a second housing 19 secured to intake auger 16. Any desired number of housings 19 may be utilized.

Housing 19 is comprised of side walls 21 and 22, front wall 23 and back wall 24. Front wall 23 has mounted therein a door means 25 comprised of plate 26 and L-shaped bars 27 and 28. Plate 26 is hingedly secured to front wall 23 by means of hinge member 45. Door means 25 hingedly moves inwardly through opening 29 of front wall 23. Door means 25 is limited in its outward movement by its upper end engaging the inner surface of front wall 23 adjacent the upper portion of opening 29. Back wall 24 has an opening 30 adapted to receive the forward end of an L-shaped metering box 31 as illustrated in FIG. 3. Metering box 31 has secured to its upper open end a hopper 32. A plurality of supply tubes 33 extend into the upper end of hopper 32. A gate 34 slidably extends inwardly into hopper 32 below each of supply tubes 33 which controls the flow of material from the supply tubes.

A gate means 35 slidably extends downwardly into metering box 31 as shown in FIG. 3 to regulate the flow of material from the upper portion of metering box 31. An indicator gauge 36 is secured to gate means 35 which indicates the amount of opening below gate means 35 with respect to metering box 31. A tip-up mercury switch 37 has its lower end extending inwardly into metering box 31 from one side thereof. The contact points in mercury switch 37 are closed when mercury switch 37 is in a substantially vertical position. A plate member 38 having an arcuate upper portion 39 detachably resting on the upper edge of front wall 23 extends downwardly into housing 19. A plurality of magnets 40 are secured to the lower end of plate member 38 by any convenient means. An electric vibrator 41 is operatively secured to the bottom side of metering box 31 by bolts 42. Metering box 31 is also provided with a lid 43 hingedly secured thereto to permit access to the interior of metering box 31.

Figure 6:
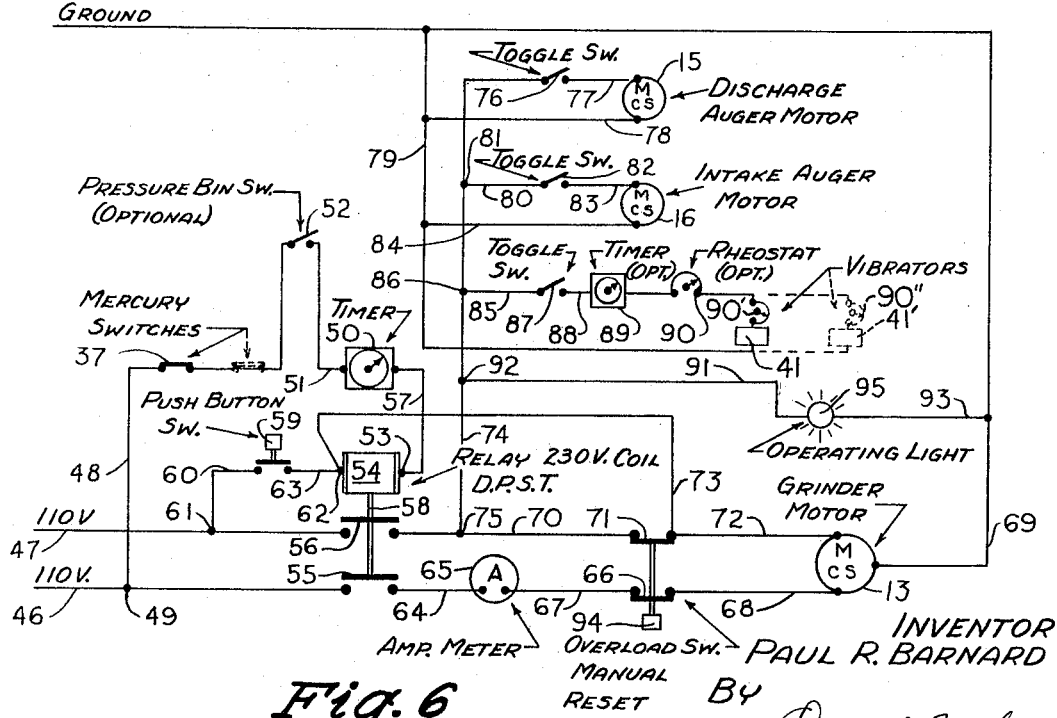
FIG. 6 is a schematic drawing of the electrical circuitry of the device.

With respect to FIG. 6, the numerals 46 and 47 represent 110 volt lines extending from a source of electrical energy. Line 48 extends from the line 46 at junction 49 to mercury switch 37. A timer 50 is connected to mercury switch 37 by means of line 51. A pressure bin switch 52 may be interposed in line 51 if so desired. Terminal 53 of a 230 volt relay coil 54 having contact points 55 and 56 is connected to timer 50 by line 57. Contact points 55 are interposed in line 46 while contact points 56 are interposed in line 47. Relay coil 54 operates a solenoid 58 which in turn opens and closes contact points 55 and 56.

A push button switch 59 is connected to line 47 by means of line 60 extending from junction 61. Push button switch 59 is connected to terminal 62 of relay coil 54 by means of line 63. Line 64 connects contact points 55 to an ammeter 65 which is in turn connected to an overload 66 by means of line 67. Overload 66 is connected to a 230 volt grinding motor 13 by means of line 68. Motor 13 is grounded by means of line 69. A line 70 connects contact points 56 to an overload 71 which is in turn connected to motor 13 by means of line 72. Line 73 connects terminal 62 of relay coil 54 to the output side of overload 71. A line 74 connects line 70 at junction 75 to toggle switch 76 which is in turn connected to a 110 volt discharge auger motor 15 by line 77. Motor 15 is grounded by line 78 which is connected to line 79 which is connected to line 69. Line 80 extends from junction 81 on line 74 to a toggle switch 82 which is connected to a 110 volt intake auger motor 16 by line 83. Motor 16 is grounded by line 84 extending therefrom to line 79. Line 85 extends from junction 86 on line 74 to a toggle switch 87 which is connected to a 110 volt vibrator 41 by line 88. A timer 89 having a "hold" position thereon and rheostat 90 may be interposed in line 88 if so desired. The numeral 41 represents an additional vibrator if a second metering means is used in the system. A rheostat 90' is operatively connected to vibrator 41 while rheostat 90'' is operatively connected to vibrator 41'. Vibrator 41 is grounded by line 79. An operating light 95 is connected to line 74 by line 91 at junction 92. Operating light 90 is grounded by line 93 extending therefrom to line 69.

Overloads 66 and 71 have connected thereto an overload switch manual reset 94. If so desired, the vibrators 41 in the system may be adapted to be either plugged into an external source of electrical energy or into the electrical circuitry as illustrated in FIG. 6. This will allow the vibrators to be operated by themselves without the necessity of energizing the entire system. This will be extremely helpful in setting up the initial flow of the system.

The normal method of operation is as follows. One of gates 34 in supply tubes 33 is opened so that a particular supplement or grain is supplied to hopper 32. Supply tubes 33 are connected to a source of grain or supplement by any convenient method. Gate 35 in metering box 31 is adjusted to the approximate desired opening using indicator gauge 36. Optional timer 89 will be placed in the "hold" position to close the contact points therein. Timer 50 is then set to the desired operating time. Mercury switch 37 will be in an upright "on" position due to the supplement in metering box 31 bearing against its inner end. Mercury switch 37 and timer 50 are connected in series and will supply current to terminal 53 of relay coil 54 at this point. The grinding motor 13 is started by depressing push button switch 59. A circuit is completed through relay coil 54 thereby causing contact points 55 and 56 to close. A circuit will then be completed through motor 13. After motor 13 has started, push button switch 59 is released. Relay coil 54 will remain energized due to line 73 extending from overload 71 to terminal 62 of coil 54. Discharge auger motor 15 is then started by closing toggle switch 76. Intake auger motor 16 is then started by closing toggle switch 82. The vibrator 41 is then started by closing toggle switch 87. The optional timer 89 and optional rheostat 90 would also be energized by closing toggle switch 87. If at any time the grinding motor 13 should become overloaded, overloads 66 and 71 will "kick out" thereby breaking the circuit. Relay coil 54 will be de-energized due to the lack of current from the output side of overload 71 through wire 73. The de-energizing of coil 54 will cause contact points 55 and 56 to open thereby breaking the circuit to motors 15 and 16, timer 89, rheostat 90, and vibrator 41. If during the mixing and grinding operation, hopper 32 should become empty due to some unforeseen difficulty, mercury switch 37 will assume a horizontal position thereby opening the contact points therein. Current will then be discontinued to terminal 53 of relay coil 54 thereby completely de-energizing motors 13, 15 and 16, vibrator 41, timer 89 and rheostat 90.

If timer 50 achieves its predetermined setting the circuit to terminal 53 will also be broken. This also results in a complete de-energizing of the circuit as immediately described above.

Therefore, after timer 50 is set to a predetermined time, the operation may be started and left to operate by itself without the attention of an operator. If discharge motor 15 should accidentally stop, grinding motor 13 will become overloaded and cause overloads 66 and 71 to "kick out." If pressure bin switch 52 is used it provides an additional safety feature to the device. If the supply bin becomes empty the pressure bin switch 52 will de-energize the system. This insures that the proper grains or supplements are being inserted into the feed.

The precise amount of flow from metering box 31 may be checked at any time without interfering with the grinding operation and would be done immediately after the system has been activated. Plate 38 is removed from housing 19. Door means 25 is hingedly moved inwardly to a position shown in FIG. 3. The feed flowing from the lower forward end of metering box 31 will flow onto the outer surface of plate 26. Guide bars 27 and 28 direct the flow of feed into a spout configuration. A suitable receptacle is placed into position to collect the flow from door means 25 for a measured length of time. Optional timer 89 may be utilized during this phase of the operation if so desired. The timer 89 would aid the operator in accurately measuring the elapsed time. At the end of the measured time, door means 25 will be closed, plate 38 placed into operation position and the feed weighed. Gate means 35 may then be adjusted to achieve the desired flow or vibrator 41 adjusted by means of adjusting the voltage thereto by means of rheostat 90'. Gate means 35 would be the primary adjustment and the rheostat 90' would be the secondary adjustment. This procedure would be repeated until the exact flow has been arrived at.

Usually, the rate of flow would be set up prior to the grinding operation. This would be facilitated by being able to operate the vibrator without operating the remainder of the equipment. Vibrator 41 would be activated and the flow checked as described above. After the desired flow from a particular metering box has been reached, the vibrator associated with that particular metering box would be de-energized. This procedure would be repeated for each metering device in the system.

The rheostat 90 is optional equipment. The purpose of rheostat 90 is to increase or decrease the voltage to the vibrator to increase or decrease the flow of feed if ammeter 65 shows either too much "load" or not enough "load" on feed grinding motor 13.

The magnets 40 secured to plate 38 are located in the path of the material flowing from metering box 31 into hopper 19. The magnets 40 extract any "tramp metal" which happens to be in the grain or supplement.

The position of metering box 31 in opening 30 of housing 19 is an additional safety feature. If intake auger 16 should stop operating, the grain or supplement will now flow from the upper end of housing 19 due to the relative location of the lower end of metering box 31 and the hopper 19. The grain or supplement will simply back up into metering box 31 and thereby stop the flow. This prevents the contents of the supply bin from being dumped onto the floor in the vicinity of the metering box.

For illustration purposes, assume that the grinding motor will grind 1500 pounds per hour and that the livestock feed is to be comprised of 5 parts corn, 3 parts oats and 2 parts soybean meal. This means that three metering devices will be installed on intake auger 16 and that 750 pounds of corn, 450 pounds of oats and 300 pounds of soybean meal must be supplied to the grinder during each hour of operation. By either adjusting each metering box 31 before the start of the operation or by energizing the entire system, the proper amount of ingredients can be supplied to the grinder. The metering box supplying corn to intake auger 16 will be adjusted to flow 12.5 pounds per minute. The metering box supplying oats to intake auger 16 will be adjusted to flow 7.5 pounds per minute. The metering box supplying soybean meal will be adjusted to flow 5 pounds per minute. These ingredients are easily and quickly "set up" by means of door means 26 as described above. As stated above, once the operation has started the flow from a particular metering box can be checked without shutting down the operation.

Thus from the foregoing it can be seen that the device will accomplish at least all of its stated objectives.

Some changes may be made in the construction and arrangement of my Feed Mixing and Processing Mechanism without departing from the real spirit and purpose of my invention, and it is my intention to cover by my claims, any modified forms of structure or use of mechanical equivalents which may be reasonably included within their scope.

I claim:

1. In a feed mixing and processing mechanism, comprising in combination,
   a grinding mill having discharge and intake openings therein,
   an intake auger operatively connected to said intake opening,
   a discharge auger operatively connected to said discharge opening,
   at least one metering box operatively connected to said intake auger and in communication with the interior thereof,
   a supply means for supplying feed material to said metering box,
   means on said metering box for controlling the rate of feed material flow from said metering box,
   and power means for operating said grinding mill, discharge auger and intake auger.

2. In a feed mixing and processing mechanism, comprising in combination,
   a grinding mill having discharge and intake openings therein,
   an intake auger operatively connected to said intake opening,
   a discharge auger operatively connected to said discharge opening,
   at least one metering box operatively connected to said intake auger and in communication with the interior thereof,
   a hopper means having its lower end operatively mounted on said metering box,
   a supply means for supplying feed material to said hopper means,
   means on said metering box for controlling the rate of feed material flow from said metering box,
   and power means for operating said grinding mill, discharge auger and intake auger.

3. The structure of claim 2 wherein said means on said metering box for controlling the rate of feed material flow from said metering box includes an adjustable gate means.

4. The structure of claim 2 wherein said means on said metering box for controlling the rate of feed material flow from said metering box includes a vibrating means.

5. The structure of claim 2 wherein said means on said metering box for controlling the rate of feed material flow from said metering box includes a vibrating means and an adjustable gate means.

6. In a feed mixing and processing mechanism, comprising in combination,
   a grinding mill having discharge and intake openings therein,
   an intake auger operatively connected to said intake opening,
   a discharge auger operatively connected to said discharge opening,
   a metering box operatively connected to said intake auger and in communication with the interior thereof,
   a supply means for supplying feed material to said metering box,
   means on said metering box for controlling the rate of feed material flow from said metering box,
   and a magnet means in said metering box for removing metal particles from said feed material.

7. In a feed mixing and processing mechanism, comprising in combination,
   a grinding mill having discharge and intake openings therein,
   an intake auger operatively connected to said intake opening,
   a discharge auger operatively connected to said discharge opening,
   a housing embracing said intake auger,
   said housing having its interior in communication with the interior of said intake auger,
   said housing having an open upper end,
   a door means hingedly mounted in the front wall of said housing,
   a metering box operatively connected to said open upper end of said housing,
   a supply means for supplying feed material to said metering box,
   means on said metering box for controlling the rate of feed material flow from said metering box into said housing,
   said door means capable of diverting the flow of feed material from said metering box to the outside of said housing at times,
   and power means for operating said grinding mill, discharge auger and intake auger.

8. The structure of claim 7 wherein said means on said metering box for controlling the rate of feed material flow from said metering box includes a vibrating means and an adjustable gate means.

9. In a feed mixing and processing mechanism, comprising in combination,
   a grinding mill having discharge and intake openings therein,
   an intake auger operatively connected to said intake opening,
   a discharge auger operatively connected to said discharge opening,
   a housing embracing said intake auger,
   said housing having its interior in communication with the interior of said intake auger,
   said housing having an open upper end,
   a door means hingedly mounted in the front wall of said housing, a metering box operatively connected to said open upper end of said housing, a supply means for supplying feed material to said metering box, a vibrating means and an adjustable gate means on said metering box for controlling the rate of feed material flow from said metering box into said housing, said door means capable of diverting the flow of feed material from said metering box to outside of said housing at times, power means for operating said grinding mill, discharge auger, intake auger and vibrating means, a magnet in said housing adjacent the inner surface of said door means, and a feed sensing shut-off means in said metering box to de-energize said power means at times.

10. In a feed mixing and processing mechanism, comprising in combination, a grinding mill having discharge and intake openings therein, an intake auger operatively connected to said intake opening, a discharge auger operatively connected to said discharge opening, a metering box operatively connected to said intake auger and in communication with the interior thereof, a supply means for supplying feed material to said metering box, means on said metering box for controlling the rate of feed material flow from said metering box, power means for operating said grinding mill, discharge auger and intake auger, said power means comprised of a 110 volt intake auger motor, a 110 volt discharge auger motor and a 230 volt grinding mill motor, a control means for said power means, first and second sources of 110 volt current, a 230 volt relay coil having first and second contact points interposed in said first and second sources of 110 volt current respectively, said control means including a line extending from said first source of 110 volt current to a mercury switch and a timer connected in series to a first terminal of said 230 volt relay coil.

said second source of 110 volt electrical current connected to a second terminal of said 230 volt relay coil and having a switch therebetween, said first and second sources of 110 volt current operatively connected to said 230 volt motor, a first overload switch in said first source of 110 volt current between said first contact points and said 230 volt motor, a second overload switch in said second source of 110 volt current between said second contact points and said 230 volt motor, a vibrator, said discharge auger motor, intake auger motor and vibrator connected in series to said second source of 110 volt current between said second contact points and said second overload switch.

11. In a feed mixing and processing mechanism, comprising in combination, a grinding mill having discharge and intake openings therein, an intake auger operatively connected to said intake opening, a discharge auger operatively connected to said discharge opening, a metering box operatively connected to said intake auger and in communication with the interior thereof, a supply means for supplying feed material to said metering box, means on said metering box for controlling the rate of feed material flow from said metering box, power means for operating said grinding mill, discharge auger and intake auger, said power means comprised of a 110 volt intake auger motor, a 110 volt discharge auger motor and a 230 volt grinding mill motor, a control means for said power means, first and second sources of 110 volt current, a 230 volt relay coil having first and second contact points interposed in said first and second sources of 110 volt current respectively, said control means including a line extending from said first source of 110 volt current to a mercury switch and a timer connected in series to a first terminal of said 230 volt relay coil, said second source of 110 volt electrical current connected to a second terminal of said 230 volt relay coil and having a switch therebetween, said first and second sources of 110 volt current operatively connected to said 230 volt motor, a first overload switch in said first source of 110 volt current between said first contact points and said 230 volt motor, a second overload switch in said second source of 110 volt current between said second contact points and said 230 volt motor, said second terminal of said 230 volt relay coil connected to the output side of said second overload switch, a second timer having a hold position thereon, a rheostat, a vibrator, said discharge auger motor, intake auger motor, vibrator, second timer and rheostat connected in series to said second source of 110 volt current between said second contact points and said second overload switch.

12. The structure of claim 11 wherein a pressure bin switch is series connected to said mercury switch and said timer.

13. In a feed mixing and processing mechanism, comprising in combination, a grinding mill having discharge and intake openings therein, an intake auger operatively connected to said intake opening, a discharge auger operatively connected to said discharge opening, a housing embracing said intake auger, said housing having rearward and forward walls and an open upper end, said rearward wall having an opening therein adjacent its upper end, said housing having its interior in communication with the interior of said intake auger, a door means hingedly mounted in the front wall of said housing, a metering box in communication with the interior of said housing, said metering box having upper and lower ends, the lower end of said metering box extending through said opening in said rearward wall, a supply means for supplying feed material to said metering box, means on said metering box for controlling the rate of feed material flow from said metering box into said housing, said door means capable of diverting the flow of feed material from said metering box to the outside of said housing at times, and power means for operating said grinding mill, discharge auger and intake auger.

14. In a feed mixing and processing mechanism, comprising in combination, a first auger, a metering device operatively connected to said first auger and in communication with the interior thereof, a supply means for supplying feed material to said metering box, means on said metering box for controlling the rate of feed material flow from said metering box, said first auger adapted to convey said feed material to a feed handling means.

and power means for operating said first auger and said feed handling means.

References Cited by the Examiner

UNITED STATES PATENTS

| | | | |
|---|---|---|---|
| 225,213 | 3/1880 | Dieryckx | 259—180 |
| 1,496,896 | 6/1924 | Laffoon | 259—180 |
| 2,762,288 | 9/1956 | Guerrero | 99—235 |
| 2,970,532 | 2/1961 | Skelton | 99—235 |
| 2,999,449 | 9/1961 | Roskamp | 99—235 |
| 3,150,863 | 9/1964 | Ronk et al. | 259—45 |

WALTER A. SCHEEL, *Primary Examiner.*

R. W. JENKINS, *Assistant Examiner.*